United States Patent Office 2,850,543
Patented Sept. 2, 1958

2,850,543

MANUFACTURE OF 1,2,2-TRICHLORO-1,1,2-TRIFLUOROETHANE

Cyril Woolf, Long Island City, N. Y., assignor to Allied Chemical Corporation, a corporation of New York No Drawing. Application February 17, 1954
Serial No. 411,017

8 Claims. (Cl. 260—653)

This invention relates to manufacture of 1,2,2-trichloro-1,1,2-trifluoroethane, $CCl_2FCClF_2$.

If obtainable in a condition not too contaminated with other chlorofluorocarbons, $CCl_2FCClF_2$ (B. P. 47.7° C.) is a particularly desirable and valuable material for use as a primary source of chlorotrifluoroethylene which in turn is employed as a monomer in certain polymerization processes. As far as now known, some prior methods for making $CCl_2FCClF_2$ are such as to result in production of mixtures of $CCl_2FCClF_2$ and $CCl_3CF_3$ along with mixtures of $CCl_2FCF_3$ and $CClF_2CClF_2$. While the tetrafluorinated compounds may be fairly easily separated from the trifluorinated compounds, the mixture of trifluorinated materials contains a relatively large proportion of $CCl_3CF_3$ (B. P. 45.9° C.), and because of the very close boiling points of the trifluorinated compounds, reasonably good separation of the trifluorinated isomers is at best commercially unattractive. Other known operations for making $CCl_2FCClF_2$ involve production of mixtures comprising dominantly $CCl_2FCClF_2$ and $CClF_2CClF_2$, and usually include appreciable amounts of the respective $CCl_3CF_3$ and $CCl_2FCF_3$ isomers. On the one hand, the presence of unacceptably large amounts of $CCl_3CF_3$ present the difficulty of its separation, and on the other, particularly with regard to manufacture of $CCl_2FCClF_2$ as major product, the formation of substantial amounts of the tetrafluorinated compounds represents waste of organic starting material and fluorine.

The major object of the present invention lies in the provision of processes for making $CCl_2FCClF_2$ from $CCl_2=CCl_2$, which is a relatively low-cost and readily available organic starting material, by easily controllable gas-phase catalytic operations which function in such a way as to effect production of $CCl_2FCClF_2$ without the formation of any objectionable quantities of unwanted chlorofluoro carbons which are inherently and disadvantageously formed in the prior art methods.

In accordance with the invention, it has been found that certain herein disclosed zirconium tetrafluorides ($ZrF_4$) have the property, under certain operating conditions, of catalyzing the reaction of $C_2Cl_4$, free chlorine and hydrogen fluoride in such a way as to effect formation of good yields of $CCl_2FCClF_2$ reaction product containing substantially no tetrafluorinated chlorofluorocarbons and having such a low $CCl_3CF_3$ isomer content as to be economically unobjectionable when the major $CCl_2FCClF_2$ product is to be utilized as a process chemical, for example, as charge to a dechlorination step to produce chlorotrifluoroethylene.

Zirconium fluorides including the anhydrous $ZrF_4$ are known in the art. However, zirconium fluorides in general, though possibly of powdery and small discrete particle characteristics, are composed of $ZrF_4$ crystals of relatively large size, i. e. not less than one thousand and usually several thousand Angstrom units radius and above. Other forms of $ZrF_4$ as described herein, when examined by the highest powered optical microscope, appear to be of non-crystalline or "amorphous" structure. When these "amorphous," by ordinary standards, zirconium fluorides are examined using X-ray diffraction technique, such materials are found to be bordering on the amorphous condition, and are extremely small, sub-microscopic crystals which are designated in the art as "crystallite." According to the invention, the $ZrF_4$ catalysts thereof are catalytically usable size (mesh) increments, e. g. granules or pellets, which are constituted of such "amorphous" zirconium fluoride having crystallite size. The desired catalytic activity prevails in zirconium fluorides of crystallite size of about 400 Angstrom units radius or below. As crystallite size decreases below this value, desired catalytic activity increases and particularly preferred zirconium fluorides include those having crystallite size of about 150 A. and below, as determined by X-ray diffraction technique.

The scope of the invention includes substantially anhydrous zirconium fluorides ($ZrF_4$) having the indicated crystallite size, and provided such fluorides are derived by reaction of substantially anhydrous $ZrCl_4$ and substantially anhydrous hydrogen fluoride. The improved catalytic material employed is prepared by treating $ZrCl_4$, which is preferably as anhydrous as commercially feasible and preferably in pure form but may suitably be of commercial or technical grade, with preferably excess quantities of inorganic fluorinating agent reactive therewith under conditions such that no liquid water is present in the reacting materials. For example, catalyst may be prepared by treating solid substantially anhydrous zirconium chloride (intended herein to designate $ZrCl_4$ and not other forms of zirconium chloride) with gaseous substantially anhydrous HF. In a gas phase fluorination operation, using HF, temperatures may be anything from above the vaporization point of HF up to about 250° C. at which temperature e. g. anhydrous $ZrCl_4$ begins to sublime appreciably. If desired, the reaction may be carried out with fluorinating agent in the liquid phase. In the catalyst synthesis reaction, HF displaces HCl causing transformation of $ZrCl_4$ to $ZrF_4$. To condition the material for better catalytic use, the resulting zirconium fluoride may be heated in an anhydrous atmosphere at elevated temperature, i. e., temperature at which conditioning or activation takes place. The finished catalyst is then recovered. Heating the $ZrF_4$ in a stream of dry nitrogen or anhydrous HF gas for about one to four hours at temperatures of about 300–350° C. or four to six hours at 250–300° C. is ordinarily suitable for this purpose. In some circumstances, the catalyst may be activated by heating the $ZrF_4$ in a stream of free oxygen-containing gas such as oxygen or air at about 400–500° C. for approximately 30 minutes to eight and one-half hours, depending mostly on the oxygen content of the treatment gas, in which case conditioning with dry nitrogen or HF gas as above mentioned may be omitted.

Zirconium fluorides prepared by the above described method of treating anhydrous $ZrCl_4$ with substantially anhydrous HF have been found to be composed of crystallites of size below about 400 A., and generally substantially below 150 A. as is desired for use in the invention. Gas-phase preparation of catalyst is illustrated in the following example, in which parts and percentages, unless otherwise noted, are on a weight basis.

*Example A*

180 parts of 4 to 14 mesh anhydrous zirconium tetrachloride of commercial grade were charged to a one inch I. D. tubular nickel reactor provided with inlet and outlet connections for a gas stream and means for externally cooling the reactor by blasts of air. An externally disposed electrical resistance heater was also supplied to furnish heat to the reactor when needed. Gaseous anhydrous HF, initially at the rate of 20 parts per hour, was passed through the reactor while maintaining the maximum internal temperature in the reactor in the range of 60–70° C. by adjusting the extent of external cooling. Reaction of ZrCl$_4$ and HF to form ZrF$_4$ and HCl was effected. Means were provided for sampling the reactor effluent gas to determine the presence of HF and/or HCl. Initially, the point of maximum reaction temperature was near the upstream end of the bed of solid zirconium chloride. Exit gas from the reactor was periodically sampled and when the evolution of HCl began to slacken and HF began to appear, the reaction temperature was gradually raised to 200° C. After 5 hours reaction, the reactor effluent gas contained only HF and was substantially free of HCl. 130 parts of zirconium fluoride, containing 98% ZrF$_4$ and less than 0.5% chlorine, in hard granular form and having substantially the same mesh size as the initial zirconium chloride, were obtained. An X-ray diffraction pattern of zirconium fluoride catalyst so prepared showed that the material, constituting the approximate 4–14 mesh catalyst, had average crystallite size of about 50 Angstrom units radius, i. e. the crystallite size was so small as to be indicative of "amorphous" structure.

If, in a gas-phase operation such as just detailed, the ZrCl$_4$ is initially in very fine or powdery form, prior to HF gassing the material may be pelleted to e. g. 4–25 mesh size, in which case pelleting should be done preferably under conditions as anhydrous as feasible.

Another suitable and convenient means for preparing the zirconium fluoride catalyst is to add solid anhydrous ZrCl$_4$ to an excess of liquefied anhydrous hydrofluoric acid in a cooled container and, after complete addition of the ZrCl$_4$, mildly agitate the mixture until reaction is substantially complete. The ZrF$_4$ so prepared may be then conditioned or activated as outlined above. Following is an example in which parts and percentages are on a weight basis, illustrating preparation of ZrF$_4$ catalyst according to the latter wet method.

*Example B*

175 parts of granular (4 to 14 mesh) anhyrous ZrCl$_4$ of commercial grade were added in small portions to liquid anhydrous hydrofluoric acid contained in an externally cooled vessel. Vigorous exothermic reaction took place and additional amounts of liquid anhydrous HF were added as needed to maintain an excess thereof. After all the zirconium chloride had been added, the mixture was stirred to promote residual reaction. When reaction of zirconium chloride appeared complete, the mass was mixed and stirred with additional liquid hydrofluoric acid and excess HF was removed by slowly boiling the mixture. 125 parts of anhydrous zirconium fluoride of about 4–20 mesh size having greater than 98% ZrF$_4$ content and containing less than 0.5% chlorine were recovered. This ZrF$_4$ was heated in a stream of dry inert gas (nitrogen) at a sufficiently elevated temperature, about 300° C., and a period of time sufficiently long, about 3 hours, to condition and activate the material. The mesh size distribution of the ZrF$_4$ particles did not change substantially during the latter heat treatment. An X-ray diffraction pattern of the catalyst thus prepared showed that the 4–20 mesh catalyst comprises material of average crystallite size of about 50 A., i. e. the crystallite size was so small as to be indicative of "amorphous" structure.

While the mechanisms of intermediate reactions taking place in practice of the invention are not entirely clear, when using CCl$_2$=CCl$_2$, elemental chlorine and anhydrous HF as raw materials, the net result under the operating conditions specified, appears to be

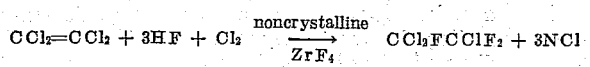

$$CCl_2=CCl_2 + 3HF + Cl_2 \xrightarrow[ZrF_4]{noncrystalline} CCl_2FCClF_2 + 3HCl$$

Reaction zone temperatures are maintained at or above the level at which fluorination of the CCl$_2$=CCl$_2$ organic starting material begins to take place in the presence of gaseous HF and free chlorine. Reaction takes hold at temperature as low as about 225° C., but commercially significant reaction appears to require temperature of about 240° C. and above. Temperature should not exceed about 400° C. since it has been found that higher temperatures promote increase in the reaction products of undesirable amounts of the unwanted CCl$_3$CF$_3$. At maximum temperatures of about 400° C., the CCl$_3$CF$_3$ content of recovered CCl$_2$FCClF$_2$ may be held below about 10% by weight and generally in most operations not more than about 7% by weight. At maximum temperature of about 375° C., the CCl$_3$CF$_3$ content may be kept not more than about 5% by weight of the $$CCl_2FCClF_2$$

recovered, comparison of appended Examples 1 and 2 indicating higher CCl$_3$CF$_3$ content and somewhat lower CCl$_2$FCClF$_2$ production at higher temperature. Hence, in general practice of the invention, preferred temperatures are in the approximate range of 240–375° C.

Mol ratios of CCl$_2$=CCl$_2$ to HF and to elemental chlorine are theoretically ⅓ and ¼ respectively. In general, the quantities of HF and Cl$_2$ utilized are sufficient to provide for formation of chlorofluorocarbon reaction product containing a worthwhile quantity of CCl$_2$FCClF$_2$. Preferably, amounts of HF and Cl$_2$ should not exceed theoretical requirements, and, depending upon particular operating conditions, quantities of HF may vary from 2 to 3 mols per mol of C$_2$Cl$_4$, and to facilitate good utilization of chlorine amounts of the latter are preferably between 60% and 80% of theory per pass of C$_2$Cl$_4$ thru the reactor.

Time of contact of C$_2$Cl$_4$ starting material with zirconium fluoride catalyst may be varied substantially without noticeable sacrifice of efficiency of operation. However, if contact time is excessive, i. e. low space velocities, the capacity of the reactor is low thereby causing economic disadvantages in the operation. On the other hand, if contact time is too short, the reaction of starting material to form desired product may be incomplete thereby entailing possible high cost of recovering and recycling unreacted material to subsequent operation. In any event, contact time should be sufficient to effect fluorinating reaction of a commercially notable amount of the C$_2$Cl$_4$ starting material. Contact time may lie in the range of about one to 25 seconds, preferably about 2 to 8 seconds. In a particular operation, optimum contact time, within the values indicated is dependent upon variables such as scale of operation, quantity of catalyst in the reactor, and specific apparatus employed and may be best determined by a test run. Atmospheric pressure operation is preferred, but the reaction may, if desired, be carried out at superatmospheric or subatmospheric pressure, the choice of pressure being largely one of convenience.

Any suitable chamber or reactor tube constructed of inert material may be employed for carrying out the reaction provided the reaction zone afforded is of sufficient length and cross-sectional area to accommodate an adequate amount of catalyst and afford sufficient space for passage of the gas mixture at an economical rate of flow. Material such as nickel, graphite, Inconel or other materials resistant to HF are suitable for use as reactor tube. Externally disposed conventional means may be employed to maintain the desired catalyst bed temperatures.

Reaction products may be recovered by conventional procedure. The temperature of the gas stream exiting the reactor may be lowered in an initial cooler to e. g. 20 to 60° C., the gas stream then scrubbed with water to condense high boiling chlorofluorocarbons and remove HF and HCl from the gas stream, passed thru aqueous caustic solution to remove chlorine and residual small amounts of HCl and HF, then passed over calcium chloride or other drying agent. The gas stream is then run thru a cold trap maintained at temperatures substantially below the boiling point of the lowest boiling material present, e. g. by indirect cooling of the gas in a bath of acetone and carbon dioxide ice. High boiling chloro fluorocarbons condensed in the water scrub solution are separated therefrom, and these organic condensates together with those from the initial gas cooler are combined with the condensate of the cold trap. The resulting composite liquor comprising reaction products and unreacted starting material, is fractionally distilled to separate components to the extent desired.

In accordance with another feature of the invention, the reaction is carried out in the presence of extraneously introduced $C_2Cl_4F_2$, either $CCl_2FCCl_2F$ (B. P. 92.8° C. or $CCl_3CClF_2$ (B. P. 91° C.). The invention reaction involves production of sought-for major product $CCl_2FCClF_2$, a minimum amount of the unwanted $CCl_3CF_3$ isomer, and, as shown for instance in appended Examples 1 and 2, a substantial amount of $CCl_3CClF_2$, and smaller amounts of $CCl_3CCl_2F$ (B. P. 138° C.) are also formed. Herein the expression "extraneously introduced $C_2Cl_4F_2$" is intended to mean $C_2Cl_4F_2$ introduced as such at the gas inlet end of the reactor and distinct from the primary raw materials $C_2Cl_4$, elemental chlorine and HF. That is, extraneously introduced $C_2Cl_4F_2$ designates the superimposition of this material on reactants in a reaction zone as a material separate and distinct from the $CCl_3CClF_2$ inherently formed during one pass of the major reactants through the reaction zone. Hence, in operation of a preferred embodiment of the invention, during a pass thru the reactor, the latter contains some $CCl_3CClF_2$ inherently formed by the reaction of the incoming $C_2Cl_4$, elemental chlorine and HF, plus some extraneously introduced $CCl_3CClF_2$ purposefully charged into a reactor along with the incoming raw materials. While the extraneously added $C_2Cl_4F_2$ may be $CCl_2FCCl_2F$, as a matter of practical consideration $CCl_3CClF_2$ is preferably employed and is utilized herein by way of exemplification.

In accordance with the instant feature of the invention, it has been found that the imposition of extraneously introduced $CCl_3CClF_2$ on the reaction serves, in some way or other, to effect an overall operation the net result of which is a $CCl_2FCClF_2$ product having a substantially reduced unwanted $CCl_3CF_3$ isomer content as compared with operations carried out in the absence of the superimposed $CCl_3CClF_2$. This reduction of $CCl_3CF_3$ content of the major product is exemplified by comparison for instance of appended Examples 3 and 4 on the one hand and Example 5 on the other. The mechanisms involved in the lowering of the $CCl_3CF_3$ content by the presence of extraneously introduced $CCl_3CClF_2$ are not wholly understood. Net reaction involving production of the trifluorinated compound $CCl_2FCClF_2$ product is substantially exothermic. Practice indicates that, probably because of the exothermic characteristics of the main reaction i. e. production of $CCl_2FCClF_2$ from the incoming $C_2Cl_4$, chlorine and HF, there is a marked tendency to create hot spots along the various points in the reactor when the reaction is carried out in the absence of extraneously introduced $CCl_3CClF_2$. On the other hand, fluorination of $CCl_3CClF_2$ (whether inherently formed or extraneously introduced) to $CCl_2FCClF_2$ is endothermic. Hence, since experience shows that unduly high temperatures promote $CCl_3CF_3$ formation, the possibility exists that because of the endothermic fluorination of $CCl_3CClF_2$ to $CCl_2FCClF_2$, the extraneously introduced $CCl_3CClF_2$ may serve to smooth out temperatures in the reactor, prevent the presence of hot spots and thereby reduce the amount of unwanted $CCl_3CF_3$ isomer formed during a single pass thru the reactor. However, regardless of theories, practice demonstrates that the presence in the reactor of extraneously introduced $CCl_3CClF_2$ significantly cuts down the unwanted $CCl_3CF_3$ content of the sought-for $CCl_2FCClF_2$ product. Superimposition on the reaction of the $CCl_3CClF_2$ affords the further highly economic advantage of increasing overall $CCl_2FCClF_2$ production of the process. This additional advantage appears to arise from the probability that extraneously introduced $CCl_3CClF_2$ suppresses formation of inherently produced $CCl_3CClF_2$, and from the fact that the extraneously introduced $CCl_3CClF_2$, if it reacts at all during a pass thru the reactor, is itself converted to the sought-for $CCl_2FCClF_2$ product.

In accordance with the invention it has been found that the foregoing advantages with regard to minimization of formation of $CCl_3CF_3$ become noticeable with the presence in the reactor of any appreciable amount of extraneously introduced $C_2Cl_4F_2$. However, it is desirable to conduct the reaction in the presence of extraneously introduced $C_2Cl_4F_2$ in the amount in the approximate range of 0.1–1.0 mol proportions based on the amount of $C_2Cl_4$ fed, and, to facilitate high production of $CCl_2FCClF_2$, preferably in the approximate range of 0.8–1.0 mol proportions as illustrated for instance by Examples 6 and 7. When reaction zone temperature is maintained not more than about 375° C. and reaction is carried out in the presence of extraneously introduced $C_2Cl_4F_2$, preferably $CCl_3CClF_2$, in amount of at least 0.1 mol proportion and generally in the approximate range of 0.1–1.0 mol proportions based on the amount of $C_2Cl_4$ fed, the $CCl_3CF_3$ content of recovered $CCl_2FCClF_2$ may be held below and generally substantially below 5% by weight. The extraneously introduced $C_2Cl_4F_2$ as used in the operation may be material obtained entirely from outside the process or may be $CCl_3CClF_2$ recovered from the distillation step already described and recycled through the reactor.

It has also been found that in certain commercial operations it is advantageous to pass the incoming vapor phase $CCl_2=CCl_2$ initially thru a bed of activated carbon maintained at elevated temperature prior to mixing the thus treated $C_2Cl_4$ with the elemental chlorine and anhydrous HF, and with the extraneously introduced $CCl_3CClF_2$ if employed. The activated carbon may be maintained at temperature in the range of 250–400° C., and, as above described, temperature range of the zirconium fluoride catalyst may be anywhere within the 225–400° C. range indicated. If the activated carbon treatment is employed, only the $C_2Cl_4$ should be passed thru the activated carbon, it having been found that, by so doing, most importantly overall formation of the monofluorinated $CCl_3CCl_2F$ is minimized. Further, it has been observed that reaction of $C_2Cl_4$ and chlorine should be carried out in the main $ZrF_4$ reactor in the presence of the HF, since it appears that by effecting, in the presence of HF, whatever reaction which does take place between $C_2Cl_4$ and chlorine, the fluorination operation as a whole is substantially activated, probably caused by the presence of HF at the instant of chlorination of the $C_2Cl_4$. Major advantages of use of the activated carbon lie in two features, namely, substantial increase of longevity of the $ZrF_4$ catalyst, and also the possibility of operating the $ZrF_4$ catalyst in the lower portion of the indicated 225–400° C. temperature range. Thus, when incoming $C_2Cl_4$ is initially passed thru activated carbon, it becomes possible and it is preferred to maintain temperature in the fluorination reaction zone in the approximate range of 240–300° C. Further, it has been found that when operating the main $ZrF_4$ reactor in conjunction with treatment of incoming $C_2Cl_4$ by activated carbon, in most instances, chlorine utilization is improved where the $ZrF_4$ catalyst prior to any use as such is subjected to the oxidation treatment hereinbefore described.

*Example 1.*—200 cc. of about 4–14 mesh zirconium fluoride catalyst ($ZrF_4$), prepared by procedure substantially the same as illustrated in Example A above and having crystallite size less than about 150 A., were charged into a nickel reactor tube. The tube was externally electrically heated and the tube ends were fitted with pipe connections for the inlet and outlet of a gas stream and for the insertion into the nickel tube and catalyst bed of a suitable thermocouple. Liquid $CCl_2=CCl_2$ was vaporized and mixed with gaseous anhydrous HF and free chlorine in the proportion of 1.9 mols of HF, 0.75 mol $CCl_2=CCl_2$, and 0.95 mol of $Cl_2$, and the mixture introduced at the rate corresponding with 0.75 mol of $CCl_2=CCl_2$ per hour into the inlet end of the nickel tube and passed through the bed of $ZrF_4$ catalyst. Contact time was about 4 seconds. By adjusting the electrical heaters thereby to control the rate of heat input in the gas stream, the temperature of the catalyst bed was maintained throughout the run close to and at a maximum of about 372° C. Gaseous products of the reaction were discharged from the reactor, cooled in an initial cooler to about 30° C., thence passed successively through a water scrubber to remove HF and HCl and condense high boiling products, a caustic scrubber to remove chlorine, a dryer containing $CaCl_2$ as the drying agent, and a condenser held at about minus 78° C. (to separate small quantities of extremely low-boiling by-products) by means of an external cooling bath of carbon dioxide ice and acetone. After about 4 hours, operation was discontinued. Condensates from the initial cooler, the water scrubber and the low temperature condenser were combined and distilled. Of products formed, there were recovered 12 mol percent $CCl_3CCl_2F$ (B. P. 138° C.), 42 mol percent $CCl_3CClF_2$ (B. P. 91° C.), and 46 mol percent of $CCl_2FCClF_2$ (B. P. 47.7° C.) containing about 5% by weight of $CCl_3CF_3$ (B. P. 45.9° C.). About 287 grams of $CCl_2FCClF_2$ were recovered per hour per liter of catalyst. Utilization of raw materials was 91% of the HF, 91% of the $C_2Cl_4$, and 72% of the chlorine.

Example 2.—In this example, the same catalyst and apparatus were employed as in Example 1. Liquid $CCl_2=CCl_2$ was vaporized and mixed with gaseous anhydrous HF and free chlorine in the proportion of 1.8 mols of HF, 0.78 mol $CCl_2=CCl_2$, and 0.95 mol of $Cl_2$, and the mixture introduced at the rate corresponding with 0.78 mol of $CCl_2=CCl_2$ per hour into the inlet end of the nickel tube and passed through the bed of $ZrF_4$ catalyst. Contact time was about 4 seconds. Temperature of the catalyst bed was maintained throughout the run close to and at a maximum of about 385° C. The gaseous products of the reaction were handled as in Example 1, and after about 2½ hours, operation was discontinued. Condensates from the initial cooler, the water scrubber and the low temperature condenser were combined and distilled. Of products formed, there were recovered 16 mol percent $CCl_3CCl_2F$, 38 mol percent $CCl_3CClF_2$, and 46 mol percent of $CCl_2FCClF_2$ containing about 7% by weight of $CCl_3CF_3$. About 280 grams of $CCl_2FCClF_2$ were recovered per hour per liter of catalyst. Utilization of raw materials was 85% of the HF, 83% of the $C_2Cl_4$, and 68% of the chlorine.

Example 3.—In this example, the same catalyst and apparatus as in Example 1 were employed. Liquid $CCl_2=CCl_2$ was vaporized and mixed with gaseous anhydrous HF and free chlorine in the proportion of 1.75 mols of HF, 0.75 mol $CCl_2=CCl_2$, and 0.90 mol of $Cl_2$, and the mixture introduced at the rate corresponding with 0.75 mol of $CCl_2=CCl_2$ per hour into the inlet end of the nickel tube and passed through the bed of $ZrF_4$ catalyst. Contact time was about 4 seconds. Temperature of the catalyst bed was maintained throughout the run close to and at a maximum of about 352° C. The gaseous products of the reaction were handled as in Example 1, and after about 4 and one quarter hours, operation was discontinued. Condensates were combined and distilled. Of products formed, there were recovered 15 mol percent $CCl_3CCl_2F$, 43 mol percent $CCl_3CClF_2$, and 42 mol percent of $CCl_2FCClF_2$ containing about 5% by weight of $CCl_3CF_3$. About 235 grams of $CCl_2FCClF_2$ were recovered per hour per liter of catalyst. Utilization of raw materials was 90% of the HF, 84% of the $C_2Cl_4$, and 70% of the chlorine.

Example 4.—110 cc. of about 4–14 mesh zirconium fluoride catalyst, prepared by procedure substantially the same as illustrated in Example A above and having crystallite size less than about 150 A., were charged into the reactor. Apparatus employed was substantially the same as in Example 1. Liquid $CCl_2=CCl_2$ was vaporized and mixed with gaseous anhydrous HF and free chlorine in the proportion of 1.25 mols of HF, 0.58 mol $CCl_2=CCl_2$, and 0.60 mol of $Cl_2$, and the mixture introduced at the rate corresponding with 0.58 mol of $CCl_2=CCl_2$ per hour into the inlet end of the nickel tube and passed through the bed of $ZrF_4$ catalyst. Contact time was about 6 seconds. Temperature of the catalyst bed was maintained throughout the run close to and at a maximum of about 362° C. Gaseous products were handled as in Example 1, and after about 4 and one third hours, operation was discontinued. Condensates were combined and distilled. Of products formed, there were recovered 14 mol percent $CCl_3CCl_2F$, 38 mol percent $CCl_3CClF_2$, and 48 mol percent of $CCl_2FCClF_2$ containing about 5% by weight of $CCl_3CF_3$. About 300 grams of $CCl_2FCClF_2$ were recovered per hour per liter of catalyst. Utilization of raw materials was 75% of the HF, 74% of the $C_2Cl_4$, and 71% of the chlorine.

Example 5.—The same catalyst and apparatus as in Example 4 were employed. Liquid $CCl_2=CCl_2$ was vaporized and mixed with gaseous anhydrous HF, free chlorine and extraneously introduced $CCl_3CClF_2$ in the proportion of 1.13 mols of HF, 0.50 mol $CCl_2=CCl_2$, 0.5 mol of $Cl_2$, and 0.2 mol of $CCl_3CClF_2$, and the mixture introduced at the rate corresponding with 0.5 mol of $CCl_2=CCl_2$ per hour into the inlet end of the nickel tube and passed through the bed of $ZrF_4$ catalyst. Contact time was about 6 seconds. Temperature of the catalyst bed was maintained throughout the run close to and at a maximum of about 347° C. Gaseous products were handled as in Example 1, and after about 4 hours' operation was discontinued. Condensates from the initial gas cooler, the water scrubber and the lower temperature condenser were combined and distilled. Of products formed, there were recovered 22 mol percent $CCl_3CCl_2F$, 16 mol percent $CCl_3CClF_2$, and 62 mol percent of $CCl_2FCClF_2$ containing about 2% by weight of $CCl_3CF_3$. About 415 grams of $CCl_2FCClF_2$ were recovered per hour per liter of catalyst. The 16 mol percent of $CCl_3CClF_2$ value represents the difference between the total amount of $CCl_3CClF_2$ recovered and the amount of $CCl_3CClF_2$ extraneously introduced into the reactor during operation. Hence, in over-all effect, substantially none of the extraneously introduced $CCl_3CClF_2$ underwent reaction, and the indicated $CCl_3CClF_2$ value represents the net of $CCl_3CClF_2$ formed during the operation. Utilization of row materials was 83% of the HF, 78% of the $C_2Cl_4$, and 78% of the chlorine.

Example 6.—The same catalyst and apparatus as in Example 4 were employed. Liquid $CCl_2=CCl_2$ was vaporized and mixed with gaseous anhydrous HF, free chlorine and extraneously introduced $CCl_3CClF_2$ in the proportion of 1.19 mols of HF, 0.5 mol $CCl_2=CCl_2$, 0.5 mol of $Cl_2$, and 0.41 mol of $CCl_3CClF_2$, and the mixture introduced at the rate corresponding with 0.5 mol of $CCl_2=CCl_2$ per hour into the reactor and passed through the bed of $ZrF_4$ catalyst. Contact time was about 5½ seconds. Temperature of the catalyst bed was maintained throughout the run close to and at a maximum of about 326° C. Gasous products were handled as in Example 1, and after about 3 hours, operation was discontinued. Condensates were combined and distilled. Of products formed, there were recovered 33 mol percent $CCl_3CCl_2F$, 7 mol percent $CCl_3CClF_2$, and 60 mol percent of $CCl_2FCClF_2$ containing about 0.7% by weight of $CCl_3CF_3$. About 345 grams of $CCl_2FCClF_2$ were recovered per hour per liter of catalyst. The 7 mol percent of $CCl_3CClF_2$ value represents the difference between the total amount of $CCl_3CClF_2$ recovered and the amount of $CCl_3CClF_2$ extraneously introduced into the reactor during operation. Hence, in over-all effect, substantially none of the extraneously introduced $CCl_3FCClF_2$ underwent reaction, and the indicated $CCl_3CClF_2$ value represents the net of $CCl_3CClF_2$ formed during the operation. Utilization of raw material was 67% of the HF, 68% of the $C_2Cl_4$, and 68% of the chlorine.

*Example 7.*—In this run, the same catalyst and apparatus as in Example 4 were employed. Liquid $CCl_2=CCl_2$ was vaporized and mixed with gaseous anhydrous HF, free chlorine and extraneously introduced $CCl_3CClF_2$ in the proportion of 1.2 mols of HF, 0.5 mol $CCl_2=CCl_2$, 0.5 mol of $Cl_2$, 0.41 mol of $CCl_3CClF_2$, and the mixture introduced at the rate corresponding with 0.5 mol of $CCl_2=CCl_2$ per hour into reactor and passed through the bed of $ZrF_4$ catalyst. Contact time was about 5½ seconds. Temperature of the catalyst bed was maintained throughout the run close to and at a maximum of about 340° C. Gaseous products of the reaction were handled as in Example 1, and after about 3 hours, operation was discontinued. Condensates were combined and distilled. Of products formed, there were recovered 27 mol percent $CCl_3CCl_2F$, and 73 mol percent of $CCl_2FCClF_2$ containing about 1.6% by weight of $CCl_3CF_3$. About 485 grams of $CCl_2FCClF_2$ were recovered per hour per liter of catalyst. Utilization of raw materials was 81% of the HF, 73% of the $C_2Cl_4$, and 73% of the chlorine. The total quantity of $CCl_3CClF_2$ recovered was less than the quantity of extraneous $CCl_3CClF_2$ introduced during the operation by an amount which showed that about 3 wt. percent of the extraneously introduced $CCl_3CClF_2$ reacted with HF to form $CCl_2FCClF_2$. The fact that total $CCl_3CClF_2$ recovered was less than the amount of $CCl_3CClF_2$ extraneously introduced demonstrates that the $CCl_3CClF_2$ by-product normally formed during the reaction and also part of the extraneously introduced $CCl_3CClF_2$ were converted to sought-for $CCl_2FCClF_2$, this result being accompanied by continuance of the remarkably low unwanted $CCl_3CF_3$ isomer formation.

*Example 8.*—150 cc. of about 4–14 mesh zirconium fluoride catalyst, prepared by procedure substantially the same as illustrated in Example A above and having crystallite size less than about 150 A., were charged into a nickel reactor tube provided with external electrical heating and inlet and outlet gas connections substantially as in the previous examples. Liquid $CCl_2=CCl_2$ was vaporized and passed thru a pretreater tube packed with 150 cc. of about 14 mesh Columbia 6G activated carbon maintained by external heating at about 294° C. The gaseous $CCl_2=CCl_2$ exiting the pretreater, without substantial cooling, was mixed with unheated gaseous anhydrous HF, free chlorine and extraneously introduced $CCl_3CClF_2$ in the proportion of 1.17 mols of HF, 0.54 mol $CCl_2=CCl_2$, 0.55 mol of $Cl_2$ and 0.44 mol of $CCl_3CClF_2$, and the mixture introduced at the rate corresponding with 0.54 mol of $CCl_2=CCl_2$ per hour into the inlet end of the reactor tube and passed through the bed of $ZrF_4$ catalyst. Contact time was about 6 seconds. Temperature of the catalyst bed was maintained throughout the run close to and at a maximum of about 250° C. Gaseous products of the reaction were handled as in the previous examples, and after about 2 and one half hours, operation was discontinued. Condensates were combined and distilled. There were recovered 0.22 mol per hour of $CCl_2FCClF_2$ containing about 2.6% by weight of $CCl_3CF_3$ i. e. about 268 grams of $CCl_2FCClF_2$ were recovered per hour per liter of catalyst. Utilization of raw materials was 63% of the HF, 37% of the $C_2Cl_4$, and 30% of chlorine. The total quantity of $CCl_3CClF_2$ recovered was less than the quantity of extraneous $CCl_3CClF_2$ introduced during the operation by an amount which showed that about 13 wt. percent of the extraneously introduced $CCl_3CClF_2$ reacted with HF to form $CCl_2FCClF_2$. Recovery of less amount of $CCl_3CClF_2$ than extraneously introduced shows that the $CCl_3CClF_2$ by-product normally formed during the reaction and also part of the extraneously introduced $CCl_3CClF_2$ were converted to sought-for $CCl_2FCClF_2$, this result being accompanied by desirable maintenance of low unwanted $CCl_3CF_3$ isomer formation.

*Example 9.*—150 cc. of about 4–14 mesh zirconium fluoride catalyst, prepared by procedure substantially the same as illustrated in Example A above and having crystallite size less than about 150 A., were charged into a nickel reactor tube provided with external electrical heating and inlet and outlet gas connections substantially as in the previous examples. However, the $ZrF_4$ catalyst of this example, just subsequent to manufacture of HF gassing of $ZrCl_4$ and prior to any use, was treated with commercial oxygen for about 30 minutes at temperature of about 460° C. Liquid $CCl_2=CCl_2$ was vaporized and passed thru a pretreater tube packed with 150 cc. of about 4 mesh Columbia 6G activated carbon maintained by external heating at about 263° C. The gaseous $CCl_2=CCl_2$ exiting the pretreater, without substantial cooling, was mixed with unheated gaseous anhydrous HF, free chlorine, and extraneously introduced $$CCl_3CClF_2$$

in the proportion of 1.25 mols of HF, 0.50 mol $$CCl_2=CCl_2$$

0.46 mol of $Cl_2$ and 0.41 mol of $CCl_3CClF_2$, and the mixture introduced at the rate corresponding with 0.50 mol of $CCl_2=CCl_2$ per hour into the inlet end of the reactor tube and passed through the bed of $ZrF_4$ catalyst. Contact time was about 6 seconds. Temperature of the catalyst bed was maintained throughout the run close to and at a maximum of about 280° C. Gaseous products of the reaction were handled as in the previous examples, and after about 3 hours, operation was discontinued. Condensates were combined and distilled. There were recovered 0.25 mol per hour of $CCl_2FCClF_2$ containing about 0.7% by weight of $CCl_3CF_3$, i. e. about 312 grams of $CCl_2FCClF_2$ were recovered per hour per liter of catalyst. Utilization of raw materials was 63% of the HF, 63% of the $C_2Cl_4$, and 68% of chlorine. The total quantity of $CCl_3CClF_2$ recovered was about the same as the quantity of extraneous $CCl_3CClF_2$ introduced during the operation.

I claim:

1. The process for fluorinating $CCl_2=CCl_2$ to form $CCl_2FCClF_2$ which process comprises introducing a gas phase mixture comprising $CCl_2=CCl_2$, substantially anhydrous HF and free chlorine into a reaction zone containing substantially anhydrous zirconium fluoride catalyst having crystallite size not substantially greater than 400 Angstrom units radius and having been derived by reaction of substantially anhydrous $ZrCl_4$ and substantially anhydrous HF, the amount of HF and free chlorine of the said gas phase mixture being sufficient to ultimately form a chlorofluorocarbon reaction product containing a substantial quantity of $CCl_2FCClF_2$, heating said mixture in said zone at temperature in the approximate range of 225–400° C. for a time sufficient to cause fluorinating reaction of a substantial amount of said $CCl_2=CCl_2$ and effect formation of gaseous saturated chlorofluorocarbon reaction product containing no substantial amount of tetra-fluorinated chlorofluorocarbons and comprising a substantial quantity of $CCl_2FCClF_2$ and below about 10% by weight of $CCl_3CF_3$ based on the quantity of $$CCl_2FCClF_2$$

present, and discharging said gaseous chlorofluorocarbon reaction product from said zone.

2. The process for fluorinating $CCl_2=CCl_2$ to form $CCl_2FCClF_2$ which process comprises introducing a gas phase mixture comprising $CCl_2=CCl_2$, substantially anhydrous HF and free chlorine into a reaction zone containing substantially anhydrous zirconium fluoride catalyst having crystallite size not substantially greater than 400 Angstrom units radius and having been derived by reaction of substantially anhydrous $ZrCl_4$ and substantially anhydrous HF, the amount of HF and free chlorine of the said gas phase mixture being sufficient to ultimately form a chlorofluorocarbon reaction product containing a substantial quantity of $CCl_2FCClF_2$, heating said mixture in said zone at temperature in the approximate range of 240–375° C. for a time sufficient to cause fluorinating reaction of a substantial amount of said $$CCl_2{=}CCl_2$$

and effect formation of gaseous saturated chlorofluorocarbon reaction product containing no substantial amount of tetra-fluorinated chlorofluorocarbons and comprising a substantial quantity of $CCl_2FCClF_2$ and not more than about 5% by weight of $CCl_3CF_3$ based on the quantity of $CCl_2FCClF_2$ present, and discharging said gaseous chlorofluorocarbon reaction products from said zone.

3. The process of claim 2 in which there is recovered, from the reaction products discharged from said zone, $CCl_2FCClF_2$ containing not more than about 5% by weight of $CCl_3CF_3$.

4. The process for fluorinating $CCl_2{=}CCl_2$ to form $CCl_2FCClF_2$ which process comprises introducing a gas phase mixture comprising $CCl_2{=}CCl_2$, substantially anhydrous HF and free chlorine into a reaction zone containing substantially anhydrous zirconium fluoride catalyst having crystallite size not substantially greater than 400 Angstrom units radius and having been derived by reaction of substantially anhydrous $ZrCl_4$ and substantially anhydrous HF, the amount of HF and free chlorine of the said gas phase mixture being sufficient to ultimately form a chlorofluorocarbon reaction product containing a substantial quantity of $CCl_2FCClF_2$, heating said mixture in said zone—in the presence of at least an appreciable amount of extraneously introduced $C_2Cl_4F_2$—at temperature in the approximate range of 225–400° C. for a time sufficient to cause fluorinating reaction of a substantial amount of said $CCl_2{=}CCl_2$ and effect formation of gaseous saturated chlorofluorocarbon reaction product containing no substantial amount of tetra-fluorinated chlorofluorocarbons and comprising a substantial quantity of $CCl_2FCClF_2$ and below about 10% by weight of $CCl_3CF_3$ based on the quantity of $CCl_2FCClF_2$ present, and discharging said gaseous chlorofluorocarbon reaction product from said zone.

5. The process of claim 4 in which extraneously introduced $C_2Cl_4F_2$ is present in amount in the approximate range of 0.1–1.0 mol proportions based on the amount of $CCl_2{=}CCl_2$ fed.

6. The process for fluorinating $CCl_2{=}CCl_2$ to form $CCl_2FCClF_2$ which process comprises introducing a gas-phase mixture comprising $CCl_2{=}CCl_2$, substantially anhydrous HF and free chlorine into a reaction zone containing substantially anhydrous zirconium fluoride catalyst having crystallite size not substantially greater than 400 Angstrom units radius and having been derived by reaction of substantially anhydrous $ZrCl_4$ and substantially anhydrous HF, the amount of HF and free chlorine of said gas-phase mixture being sufficient to ultimately form a chlorofluorocarbon reaction product containing a substantial quantity of $CCl_2FCClF_2$, heating said mixture in said zone—in the presence of extraneously introduced $C_2Cl_4F_2$ in amount in the approximate range of 0.1–1.0 mol proportions based on the amount of $CCl_2{=}CCl_2$ fed—at temperature in the approximate range of 240–375° C. for a time sufficient to cause fluorinating reaction of a substantial amount of said $CCl_2{=}CCl_2$ and effect formation of gaseous saturated chlorofluorocarbon reaction product containing no substantial amount of tetra-fluorinated chlorofluorocarbons and comprising a substantial quantity of $CCl_2FCClF_2$ and below about 5% by weight of $CCl_3CF_3$ based on the quantity of $$CCl_2FCClF_2$$

present, discharging from said zone said gaseous chlorofluorocarbon reaction product, and recovering therefrom $CCl_2FCClF_2$ containing below about 5% by weight of $CCl_3CF_3$.

7. The process of claim 6 in which extraneously introduced $C_2Cl_4F_2$ is present in amount in the approximate range of 0.8–1.0 mol proportions based on the amount of $CCl_2{=}CCl_2$ fed.

8. The process for fluorinating $CCl_2{=}CCl_2$ to form $CCl_2FCClF_2$ which process comprises passing vaporized $CCl_2{=}CCl_2$ through a bed of activated carbon maintained at temperature in the range of about 250–400° C., thereafter introducing a gas-phase mixture comprising said carbon treated $CCl_2{=}CCl_2$ substantially anhydrous HF and free chlorine into a reaction zone containing substantially anhydrous zirconium fluoride catalyst having crystallite size not substantially greater than 400 Angstrom units radius and having been derived by reaction of substantially anhydrous $ZrCl_4$ and substantially anhydrous HF, the amount of HF and free chlorine of said gas-phase mixture being sufficient to ultimately form a chlorofluorocarbon reaction product containing a substantial quantity of $CCl_2FCClF_2$, heating said mixture in said zone—in the presence of extraneously introduced $C_2Cl_4F_2$ in amount in the approximate range of 0.1–1.0 mol proportions based on the amount of $CCl_2{=}CCl_2$ fed into said zone—at temperature in the approximate range of 240–300° C. for a time sufficient to cause fluorinating reaction of a substantial amount of said $$CCl_2{=}CCl_2$$

and effect formation of gaseous saturated chlorofluorocarbon reaction product containing no substantial amount of tetra-fluorinated chlorofluorocarbons and comprising a substantial quantity of $CCl_2FCClF_2$ and below about 5% by weight of $CCl_3CF_3$ based on the quantity of $CCl_2FCClF_2$ present, discharging from said zone said gaseous chlorofluorocarbon reaction product, and recovering therefrom $CCl_2FCClF_2$ containing below about 5% by weight of $CCl_3CF_3$.

References Cited in the file of this patent

UNITED STATES PATENTS

| | | |
|---|---|---|
| 2,005,709 | Daudt et al. | June 18, 1935 |
| 2,005,710 | Daudt et al. | June 18, 1935 |
| 2,423,045 | Passino et al. | June 24, 1947 |
| 2,493,007 | McBee et al. | Jan. 3, 1950 |
| 2,519,342 | Berg | Aug. 22, 1950 |
| 2,637,748 | Miller | May 5, 1953 |
| 2,709,688 | Bandes et al. | May 31, 1955 |
| 2,714,618 | Woolf | Aug. 2, 1955 |
| 2,748,177 | Miller et al. | May 29, 1956 |